United States Patent [19]

Shomer

[11] Patent Number: 4,649,866
[45] Date of Patent: Mar. 17, 1987

[54] POULTRY WATERING DEVICE

[75] Inventor: Yair Shomer, Menashe, Israel

[73] Assignee: Plasson Maagan Michael Industries Ltd., Menashe, Israel

[21] Appl. No.: 795,852

[22] Filed: Nov. 7, 1985

[30] Foreign Application Priority Data

Nov. 16, 1984 [IL] Israel .................................... 73529

[51] Int. Cl.⁴ .............................................. A01K 39/02
[52] U.S. Cl. ..................................................... 119/75
[58] Field of Search .................... 119/75, 18; 285/402, 285/396, 361

[56] References Cited

U.S. PATENT DOCUMENTS 4,157,153 6/1979 Barnes ........................... 285/361 X
4,444,149 4/1984 Shomer ............................ 119/75 X Primary Examiner—Hugh R. Chamblee
Attorney, Agent, or Firm—Benjamin J. Barish

[57] ABSTRACT

A poultry watering device, connectable to a water supply line for supplying water to the poultry, comprises a cup integrally formed with a sleeve, a valve including a valve body receivable within the sleeve, and a valve operator disposable within the cup and engageable by the poultry to replenish the water supply to the cup. Bayonet-pin and socket connecting elements join the sleeve and valve body facilitate quick attachment of the cup to the valve by rotating the sleeve with respect to the valve body. Either the cup or the valve includes a projection engageable with a part of the other to restrain the rotation of the sleeve with respect to the valve body, and thereby to prevent detachment of the cup with respect to the valve by the poultry.

17 Claims, 9 Drawing Figures

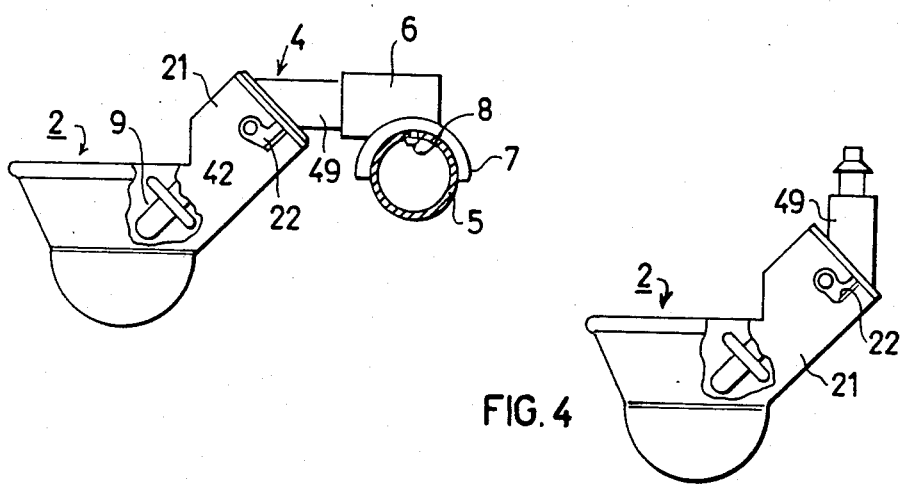
FIG. 1
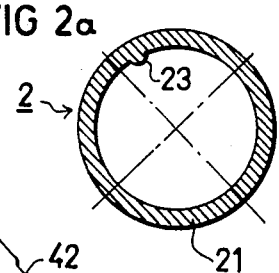
FIG. 4
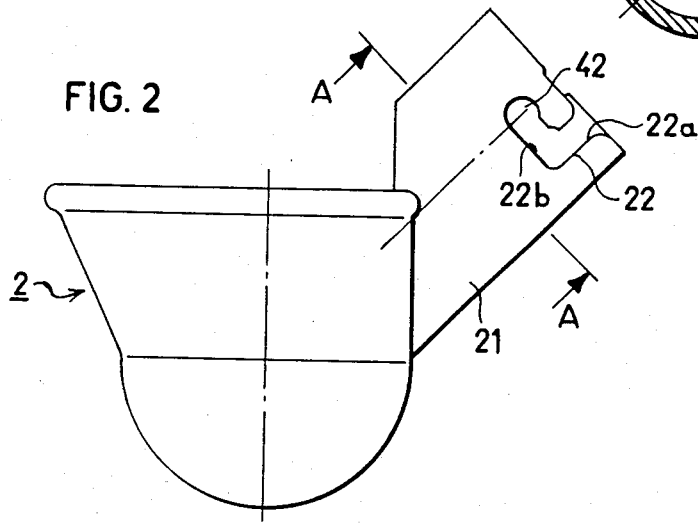
FIG. 2a
FIG. 2

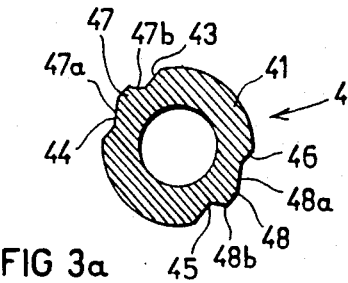
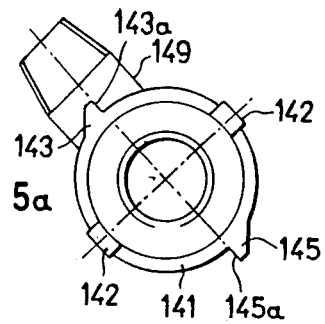
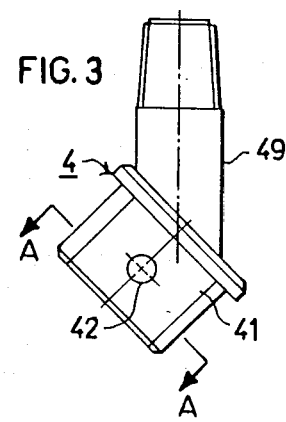
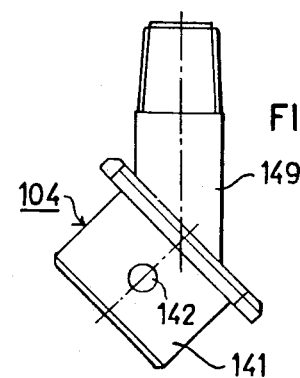
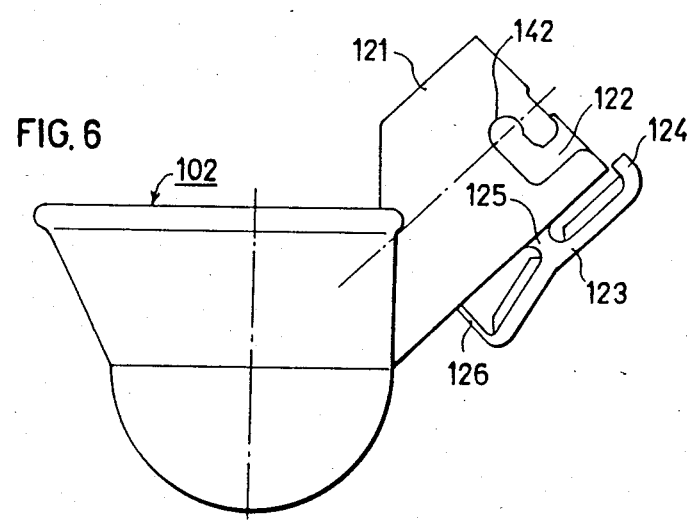

POULTRY WATERING DEVICE

BACKGROUND OF THE INVENTION

The present invention relates to poultry watering devices, and particularly to such devices including a cup having a valve assembly operable by the poultry to continuously replenish the cup with water as the poultry drink from the cup.

Examples of poultry watering devices to which the invention is particularly useful are described in U.S. Pat. No. 4,444,149. This type of poultry watering device comprises a cup member integrally formed with a sleeve, a valve member including an outer valve body receivable within the sleeve and having a valve operator disposable within the cup engageable by the poultry to replenish the water supplied by the cup, and bayonet-pin and socket connecting elements on the sleeve and valve body facilitating quick attachment of the cup member to the valve member by rotating the sleeve with respect to the valve body. Such poultry watering devices have attained widespread commercial use. However, one of the drawbacks in this known type of poultry watering device is the attaching arrangement between the cup member and the valve member which, if designed to permit quick attachment and detachment by the user, e.g. for cleaning purposes, also enables the poultry to detach the cup member from the valve member by pecking away at the cup member to rotate it until it becomes detached.

SUMMARY OF THE INVENTION

An object of the present invention is to provide poultry watering devices having advantages particularly in the above respects.

According to a broad aspect of the present invention, there is provided a poultry watering device of the foregoing type, characterized in that one of the members (i.e., the cup member or the valve member) includes a projection engageable with a part of the other member to restrain the rotation of the sleeve with respect to the valve body, and thereby to prevent detachment of the cup member with respect to the valve member by the poultry.

Two embodiments of the invention are described below for purposes of example.

In one described embodiment, the mentioned projection is a rib formed on the inner face of the sleeve and extending axially thereof, which rib is received in a recess formed in the outer face of the valve body and extending axially thereof. In this described embodiment, the valve body is preferably formed with a further axially extending recess for initially receiving the rib of the sleeve, which further recess is circumferentially-spaced from the first-mentioned recess by a cam surface having a gradual incline on one side to permit easy rotation of the sleeve in the direction bringing the rib from said further recess into the first-mentioned recess, but having a sharper incline on the opposite side to provide difficult rotation in the opposite direction bringing the rib from the first-mentioned recess to the further recess.

In the second described embodiment of the invention, the mentioned projection is a first stop element formed on the outer face of the valve body and engageable with a second stop element carried on the sleeve, which second stop element is displaceable by finger pressure to bring it out of alignment with the first stop element, and thereby to permit the rotation of the sleeve to detach the cup member from the valve member. In this embodiment, the second stop element is preferably part of a lever arm attached to the sleeve and displaceable with respect thereto by finger pressure, the lever arm being pivotably mounted on the sleeve by a fulcrum joining an intermediate portion of the lever arm to the sleeve.

It has been found that poultry watering devices constructed in accordance with the foregoing features permit the cup member to be attached and detached from the valve member with little difficulty by the user, but substantially prevent the poultry from detaching the cup member from the valve member.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a side elevational view illustrating one form of poultry watering device constructed in accordance with the invention:

FIG. 2 is a side elevational view of the cup member of FIG. 1, and FIG. 2a is a sectional view along line A—A of FIG. 2;

FIG. 3 is a side elevational view of the body member of FIG. 1, and FIG. 3a is a sectional view along line A—A of FIG. 3;

FIG. 4 is a side elevational view illustrating the device of FIG. 1 but with the valve body mounted so that its connector end extends vertically rather than horizontally as in FIG. 1;

FIGS. 5 and 5a are side elevational and end views, respectively, of the valve member in another form of poultry watering device constructed in accordance with the invention; and FIG. 6 is a side elevational view of the cup member for use with the valve member of FIGS. 5 and 5a, FIG. 6a being section along lines A—A of FIG. 6.

DESCRIPTION OF PREFERRED EMBODIMENTS

The poultry watering device illustrated in FIG. 1 comprises two main members, namely a cup member generally designated 2 (FIGS. 2, 2a) and a valve member generally designated 4 (FIGS. 3, 3a). The valve member 4 is used for attaching the device to a support, such as directly to a water supply line 5 by means of a coupling member 6 having a saddle 7 mounted to the line 6 and formed with a tap 8 providing communication between the interior of the line to the cup member 2 via the valve member 4. Valve member 4 further includes a valve assembly having a valve operator 9 disposed within cup member 2 so as to be engaged by the poultry when drinking from the cup member 2 and thereby to replenish the supply of water to it. Details of the construction of the valve assembly including valve operator 9 form no part of the present invention and are described, for example, in the above-cited patent.

Cup member 2 (FIGS. 2, 2a) is integrally formed with a cylindrical sleeve 21 provided with sockets 22 on its opposite faces, each slot 22 having an outer axial section 22a and an inner section 22b. Valve member 4 (FIGS. 3, 3a) includes a cylindrical valve body 41 receivable within sleeve 21 and provided with diametrically opposed bayonet-pins 42 receivable within sockets 22, to facilitate the quick attachment and detachment of cup member 2 from valve member 4 by rotating sleeve 21 with respect to valve body 41.

In accordance with the present invention, one of the members 2, 4 includes a projection engageable with a part of the other member to restrain the rotation of sleeve 21 with respect to valve body 41, and thereby to prevent detachment of the cup member 2 with respect to the valve member 4 by the poultry, while still permitting easy detachment of the cup member by the user, e.g. for cleaning the cup member.

As shown in FIG. 2a, the mentioned projection is a rib 23 formed on the inner face of sleeve 21 and extending axially of the sleeve. This rib 23 is received in any one of a plurality of recesses 43, 44, 45, 46 (FIG. 3a) formed on the outer face of valve body 41 and extending axially of that valve body.

More particularly, recesses 43 and 44 are formed on one side of valve body 41 and are circumferentially-spaced from each other by a cam surface 47; and recesses 45, 46 are formed on the diametrically-opposite side of valve body 41 and are circumferentially-spaced from each other by a second cam surface 48. Cam surface 47 has a gradual incline on the side 47a facing recess 44, and a sharper incline 47b on the side facing recess 43; and similarly, cam surface 48 has a gradual incline 48a on the side facing recess 46, and a sharper incline 48b on the side facing recess 45.

Sleeve 21 forms an angle of about 45 degrees with respect to the center axis of cup member 2. Valve body 41 includes a connector 49 at its outer end for connecting same, e.g. by threads, to coupling member 6 which in turn is connected via saddle member 7 and tap 8 to the water supply line 5. The axis of connector end 49 of the valve body 41 is at an angle of about 135° with respect to the opposite end of the valve member carrying the bayonet-pins 42 received within sleeve 21. This arrangement permits the valve body 4 to be attached to the cup sleeve 21 either in the position illustrated in FIG. 1 wherein the valve body 41 is disposed horizontally, or in the position illustrated in FIG. 4 wherein it extends vertically. In both positions, the cup member 2 is of course disposed in a horizontal position with the open top of the cup facing upwardly so as to permit the poultry to drink therefrom.

The poultry watering device illustrated in FIGS. 1-4 may be used in the following manner:

If valve member 4 is to be mounted in the position illustrated in FIG. 1, pins 42 of its valve body 41 are first aligned with the axial sections 22a of sockets 22, and then the valve body 41 is inserted into sleeve 21 of the cup member 2, with rib 23 of sleeve 21 aligned with recess 44 of the valve body 41. When the valve body has been inserted to the full length of socket section 22a, cup member 2 is rotated to move pins 42 through the circumferential sections 22b of socket 22. During this rotation of cup member 2, rib 23 passes over the gradual incline 47a of cam surface 47 unti the rib seats within recess 43 of valve body 41, thereby securely retaining valve member 4 attached to cup member 2.

In order to detach the cup member from valve member 4, it will be necessary to rotate the cup member in the opposite direction, whereupon rib 23 must ride over incline 47b of cam surface 47; but since this incline is sharper than incline 47a, a greater force will be required, which will substantially prevent the rotation of the cup member in this detaching direction by the pecking of the poultry.

Should it be desired to mount the valve member 4 in the position illustrated in FIG. 4, wherein its connector end 49 extends in the vertical direction, the same procedure as described above would be followed, except in this case rib 23 of sleeve 21 would be first received within recess 46 of the valve body, and then would be moved over gradual slope 48a of cam surface 48 into recess 45 for retaining the cup member in the horizontal position during the normal use of the device.

FIGS. 5 and 6 illustrate another construction of the valve body and cup member, respectively, for preventing detachment of the cup member from the valve member by the poultry, while still permitting quick attachment and detachment of the cup member by the user.

Thus, as shown in FIG. 6, the cup member, therein designated 102, is also formed with a sleeve 121 including a slot 122 on its opposite sides for receiving the bayonet-pins 142 formed on the diametrically opposite sides of valve body 141 of the valve member 104 shown in FIG. 5. In this case, however, sleeve 121 is formed with a lever arm 123 terminating at its outer end in an in-turned tip 124 projecting just past the end of the sleeve. An intermediate portion of lever arm 123 is integrally attached, at 125, to sleeve 121; and the opposite end of the lever arm is integrally attached to the sleeve by a resilient web portion 126. It will thus be seen that when finger pressure is applied to the end portion of lever arm 123 between its intermediate attachment 125, and its end resilient web 126, the lever pivots about its attachement 125, the latter serving as a fulcrum, to move the opposite down-turned end 124 away from sleeve 121.

The latter end 124 of lever 123 serves as a stop element which co-operates with a stop element 143 formed on the outer face of body member 141, or a stop element 145 formed on the body member at the diametrically opposite side thereof.

Thus, as shown in FIG. 5a, stop element 143, formed between the bayonet-pins 142 has a flat surface 143a engageable by end 124 of lever 123, when the latter lever is in its normal illustrated position, thereby normally preventing rotation and detachment of cup member 102 from valve member 104. However, when the cup member is to be detached, e.g. for cleaning purposes, the user presses the portion of lever arm 123 between its fulcrum 125 and its resilient web 126, to thereby lift stop element 124 out of alignment with stop element 143, thereby permitting the cup member 102 to be rotated for detaching same from the valve member.

Stop element 143 on one side of valve member 104 thus co-operates with stop element 124 on cup member 102 in one position of the valve member, for example, the position illustrated in FIG. 1. If the valve member is to be mounted with its connector element in the vertical position, as illustrated in FIG. 4, then stop element 145 on the opposite side of valve member 104 would co-operate with stop element 124 of the cup member 102 to prevent rotation of the cup member except when lever arm 123 has been depressed in the manner described above.

While the invention has been described with respect to two preferred embodiments, it will be appreciated that many other variations, modifications, and applications of the invention may be made.

I claim:

1. A poultry watering device connectable to a water supply line for supplying water to the poultry, comprising a cup member integrally formed with a sleeve, a valve member including a valve body receivable within said sleeve and a valve operator disposable within said cup and engageable by the poultry to replenish the water supply to the cup, and bayonet-pin and socket connecting elements on said sleeve and valve body facilitating quick attachment of said cup member to said valve member by rotating said sleeve with respect to said valve body; characterized in that one of said members includes a projection engageable with a part of the other of said members to restrain the rotation of said sleeve with respect to said valve body, and thereby to prevent detachment of said cup member with respect to said valve member by the poultry.

2. The device according to claim 1, wherein said projection is a rib formed on the inner face of said sleeve and extending axially thereof, which rib is received in a recess formed in the outer face of said valve body and extending axially thereof.

3. The device according to claim 2, wherein said valve body is formed with a further axially extending recess for initially receiving said rib of the sleeve, said further recess being circumferentially spaced from the first-mentioned recess by a cam surface having a gradual incline on one side to permit easy rotation of said sleeve in the direction to bring said rib from said further recess into said first-mentioned recess, but a sharper incline on the opposite side to provide difficult rotation of said sleeve in the opposite direction to bring said rib from said first-mentioned recess into said further recess when detaching said cup member from said valve member.

4. The device according to claim 2, wherein the axis of said sleeve forms an angle of about 45 degrees with respect to the center axis of the cup, said valve body include a connector at its outer end for connecting same to the water supply line, the axis of said connector end of the valve body being at an angle of about 135° with respect to the axis of the remainder of the valve body, such that the valve body may be selectively attached to the cup sleeve with said connector end extending either vertically or horizontally, and with the open top of the cup facing upwardly; said valve body being formed with one of said longitudinally extending recesses at diametrically opposite sides thereof so as to be capable of receiving said rib of the sleeve in either of said selective attachment positions of the valve body with respect to said sleeve.

5. The device according to claim 1, wherein said projection is a first stop element formed on an outer face of said valve body and engageable with a second stop element carried on said sleeve, said second stop element being displaceable by finger pressure to permit the rotation of said sleeve when detaching same from said valve body.

6. The device acccording to claim 5, wherein said second stop element is part of a lever arm attached to said sleeve and displaceable with respect thereto by finger pressure.

7. The device according to claim 6, wherein said lever arm is mounted on said sleeve by a fulcrum joining an intermediate portion of the lever arm to said sleeve.

8. The device according to claim 7, wherein said second stop element is formed at one end of the lever arm, the opposite end of the lever arm being joined to the sleeve by a resilient web permitting said opposite end to be manually depressed in order to move said second stop element out of alignment with said first stop element when detaching the cup member from the valve member.

9. The device according to claim 5, wherein the axis of said sleeve forms an angle of about 45° with respect to the center axis of the cup, and said valve body includes a connector at its outer end for connecting same to the water supply line; the axis of said connector end of the valve body being at an angle of 135° with respect to the axis of the remainder of the valve body, such that the valve body may be selectively attached to the cup sleeve with said connector end extending either vertically or horizontally, and with the open top of the cup facing upwardly; said valve body being formed with one of said first stop elements at diametrically opposite sides thereof so as to be engageable with said second stop element carried by said sleeve in either of said selective attachment positions of the valve body with respect ot said sleeve.

10. A poultry watering device connectable to a water supply line for supplying water to the poultry, comprising a cup member integrally formed with a sleeve, a valve member including a valve body receivable within said sleeve and a valve operator disposable within said cup and engageable by the poultry to replenish the water supply to the cup, and bayonet-pin and socket connecting elements on said sleeve and valve body facilitating quick attachment of said cup member to said valve member by rotating said sleeve with respect to said valve body; the inner face of said sleeve being formed with a rib extending axially thereof, said rib being received in a recess formed in the outer face of said valve body and extending axially thereof, to restrain the rotation of said sleeve with respect to said valve body, and thereby to prevent detachment of said cup member with respect to said valve member by the poultry.

11. The device according to claim 10, wherein said valve body is formed with a further axially extending recess for initially receiving said rib of the sleeve, said further recess being circumferentially spaced from the first-mentioned recess by a cam surface having a gradual incline on one side to permit easy rotation of said sleeve in the direction to bring said rib from said further recess into said first-mentioned recess, but a sharper incline on the opposite side to provide difficult rotation of said sleeve in the opposite direction to bring said rib from said first-mentioned recess into said further recess when detaching said cup member from said valve member.

12. The device according to claim 10, wherein the axis of said sleeve forms an angle of about 45 degrees with respect to the center axis of the cup, said valve body include a connector at its outer end for connecting same to the water supply line, the axis of said connector end of the valve body being at an angle of about 135° with respect to the axis of the remainder of the valve body, such that the valve body may be selectively attached to the cup sleeve with said connector end extending either vertically or horizontally, and with the open top of the cup facing upwardly; said valve body being formed with one of said longitudinally extending recesses at diametrically opposite sides thereof so as to be capable of receiving said rib of the sleeve in either of said selective attachment positions of the valve body with respect to said sleeve.

13. A poultry watering device connectable to a water supply line for supplying water to the poultry, comprising a cup member integrally formed with a sleeve, a valve member including a valve body receivable within said sleeve and a valve operator disposable within said cup and engageable by the poultry to replenish the water supply to the cup, and bayonet-pin and socket connecting elements on said sleeve and valve body facilitating quick attachment of said cup member to said valve member by rotating said sleeve with respect to said valve body; the outer face of said valve body being formed with a projection constituting a first stop element, said sleeve being formed with a second stop element engageable by said first stop element to restrain the rotation of said sleeve with respect to said valve body, and thereby to prevent detachment of said cup member with respect to said valve member by the poultry; said second stop element being displaceable by finger pressure to permit the rotation of said sleeve when detaching same from said valve body.

14. The device according to claim 13, wherein said second stop element is part of a lever arm attached to said sleeve and displaceable with respect thereto by finger pressure.

15. The device according to claim 14, wherein said lever arm is mounted on said sleeve by a fulcrum joining an intermediate portion of the lever arm to said sleeve.

16. The device according to claim 15, wherein said second stop element is formed at one end of the lever arm, the opposite end of the lever arm being joined to the sleeve by a resilient web permitting said opposite end to be manually depressed in order to move said second stop element out of alignment with said first stop element when detaching the cup member from the valve member.

17. The device according to claim 13, wherein the axis of said sleeve forms an angle of about 45° with respect to the center axis of the cup, and said valve body includes a connector at its outer end for connecting same to the water supply line; the axis of said connector end of the valve body being at an angle of 135° with respect to the axis of the remainder of the valve body, such that the valve body may be selectively attached to the cup sleeve with said connector end extending either vertically or horizontally, and with the open top of the cup facing upwardly; said valve body being formed with one of said first stop elements at diametrically opposite sides thereof so as to be engageable with said second stop element carried by said sleeve in either of said selective attachment positions of the valve body with respect ot said sleeve.

* * * * *